US 6,718,362 B1

(12) United States Patent
Beadle et al.

(10) Patent No.: US 6,718,362 B1
(45) Date of Patent: Apr. 6, 2004

(54) EXTENDING FUNCTIONALITY OF NETWORK I/O APIS BY USING CALL-BACK MECHANISMS

(75) Inventors: Bruce A. Beadle, Round Rock, TX (US); Michael Wayne Brown, Georgetown, TX (US); Randolph Michael Forlenza, Austin, TX (US); Douglas Scott Rothert, Austin, TX (US); Miguel Sang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 09/584,067

(22) Filed: May 31, 2000

(51) Int. Cl.[7] .............................................. G06F 13/00
(52) U.S. Cl. ........................ 709/201; 709/223; 709/224; 709/226
(58) Field of Search ................................. 709/200, 201, 709/202, 212, 213, 214, 215, 216, 217, 218, 219, 230, 223, 224, 226

(56) References Cited

U.S. PATENT DOCUMENTS 6,148,336 A * 11/2000 Thomas et al. ............. 709/224

6,434,617 B1 * 8/2002 Clough et al. .............. 709/227

* cited by examiner

Primary Examiner—Moustafa M. Meky
(74) Attorney, Agent, or Firm—Marilyn Smith Dawkins; Bracewell & Patterson, L.L.P.

(57) ABSTRACT

A method, system, and program that efficiently augments and enhances the functions of a network library with new functional elements. The method, system and program provide an extension utility, which contains a number of extended library services, such as security, Reliability, Availability, Serviceability, RAS, load balancing, snooping, and logging. The extended library services also include a general network monitoring function, by which a network connection is monitored, and the conditions reported back to the client. Also provided is a control utility, which places hooks related to one or more extended library services in the library processing code of the network protocol stack. The control utility-places the hooks within a call sequence based on a priority determination. Thus, hooks are placed within the call response sequence relative to the time the standard library services are to be performed. During response to a network call or other network process, the hooks operate to call back to and implement the particular extended library service(s). The corresponding extended library service is thus effectively added to the standard library services.

23 Claims, 9 Drawing Sheets

EXTENDING FUNCTIONALITY OF NETWORK I/O APIS BY USING CALL-BACK MECHANISMS

BACKGROUND OF THE INVENTION

1. Technical Field

The present invention relates in general to computer networks and in particular to network libraries utilized in network communications. Still more particularly, the present invention relates to a method, system and program product for extending and enhancing the available functionality of network libraries by using call-back mechanisms.

2. Description of the Related Art

Computer networks including local area networks (LANs), such as Ethernet, Token Ring and ARCnet, and wide area networks (WANs), such as the Internet, are commonly used today to interconnect computers and allow for direct communication and sharing of information and peripherals among dispersed computers.

As is well known in the art, transmission of data packets across networks is governed by a set of rules called "transport protocols." Network communications rely on network protocols to establish connections and perform transactions such as sending and receiving data. Presently many different transport protocols, such as Transmission Control Protocol (TCP) utilized for Internet communication, are available. Such transport protocols are often implemented by drivers, which can be loaded as network libraries on a computer system connected to the network.

Network libraries are pre-packaged software libraries, which are loaded onto a computer and used by the applications that require network support. Typically, the functions available with the network libraries are pre-set and cannot be easily modified or expanded to include additional functionality, which may be desired. For example, network communications can be enhanced by using encryption to enhance the security of the data being sent and received. A user may thus desire to augment his available network library functions with encryption. However, current network libraries, which do not provide encryption services, cannot be augmented once they have been purchased and installed. Because of the difficulty to physically modify each library stack to provide additional functionality, new network library applications, which include both the standard network library and the additional functional elements, must be purchased.

As networks become more dispersed and user networking needs change, the standard libraries become quickly outdated with respect to the provided network functionality. Cost and other factors prevent the complete replacement of network libraries, particularly since not every network (or user) has the same needs with regard to additional functional elements. There is presently no way to efficiently extend the present network libraries to include particular functional elements.

The present invention recognizes that it would therefore be desirable to have a method, system, and program for extending and/or enhancing the available functionality of network libraries. A method, system, and program which allow enhancement of network communication without re-coding the current network libraries or protocol stacks will be welcomed improvements. These and other benefits are provided in the present invention.

SUMMARY OF THE INVENTION

A method, system, and program is described that efficiently augments and enhances the functions of a network library with new functional elements. The method, system and program provide an extension utility, which contains a number of extended library services, such as security, reliability, availability, and serviceability (RAS), load balancing, snooping, and logging. The extended library services also include a general network monitoring function, by which a network connection is monitored, and the conditions reported back to the client. Also provided is a control utility, which places hooks related to one or more extended library services in the library processing code of the network protocol stack. During response to a network call, the hooks call back to and implement the particular extended library service(s). The corresponding extended library service is thus effectively added to the standard library services.

In a preferred embodiment, the control utility places the hooks within a call sequence based on a priority determination. Thus, all hooks are placed within the library processing code response relative to the time the standard library services is to be performed. Also, in another embodiment, a graphical user interfaces allows a user of the network connected computer system to select which extended library services to apply to network calls. The user may set or remove the extended library services and determine the relative time for implementing the extended library services.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
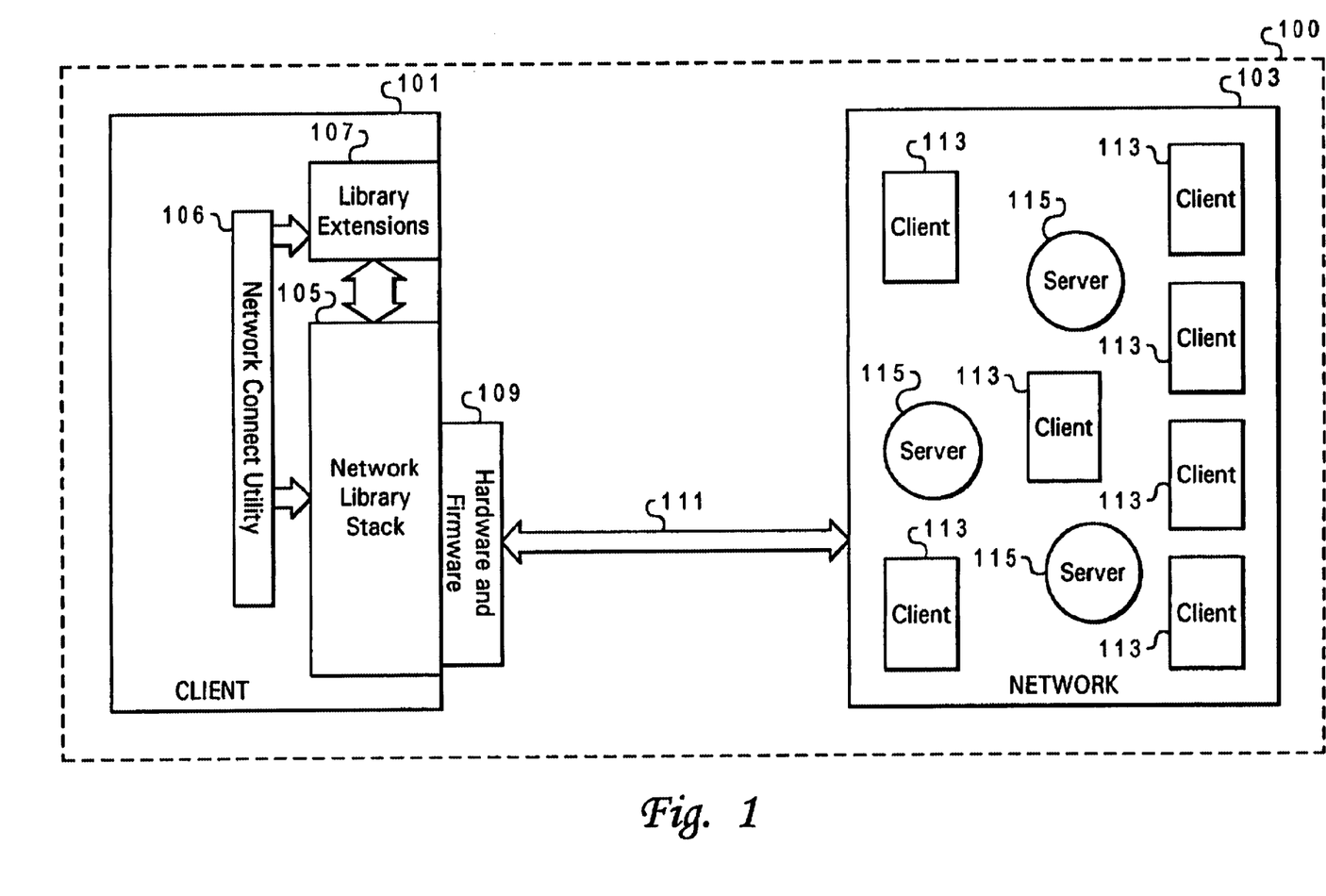
FIG. 1 depicts an illustrative embodiment of a computer network environment with which the method and system of the present invention may advantageously be utilized.

With reference now to the figures and in particular with reference to FIG. 1, there is depicted an illustrative embodiment of a network environment in which the present invention may advantageously be utilized. As illustrated, network environment 100 includes a first client 101, which is coupled to network 103 via a connecting medium 111. Although depicted as external to network 103, it is understood that first client 101 may also be depicted as one of clients 113 within network 101. For the purposes of this invention, the term client is utilized to refer to both the hardware component connected to a network server and the software applications stored in memory and being run on the hardware component.

First client 101 includes software, firmware and hardware components for connecting to network 103. In the illustrative embodiment, software components include network library stack 105, network connection utility 106, and library extensions 107. Network connection utility 106 operates as the control mechanism of functional elements of the invention. Firmware and hardware components 109 may include application programing interface (APIs), network adapter, and modem, etc.

Network 103 comprises several clients 113 and servers 115. Network servers 115 and clients 113 are typically computer systems having a database, OS, and network software. Network software controls access to and from network 103 and its resources by clients 113 and provides resources to clients 113. Each client 113 is preferably coupled to at least one server 115. Clients 113 and servers 115 also contain a network library stack, and may also contain library extensions 107. Library extensions 107 are loaded on clients 113 and/or servers 115 by a user or network administrator (or developer). Various other network topologies are possible, and the invention applies to each of the possible variations. Thus, network 103 may be a local area network (LAN) or a wide area network (WAN).

Figure 2:
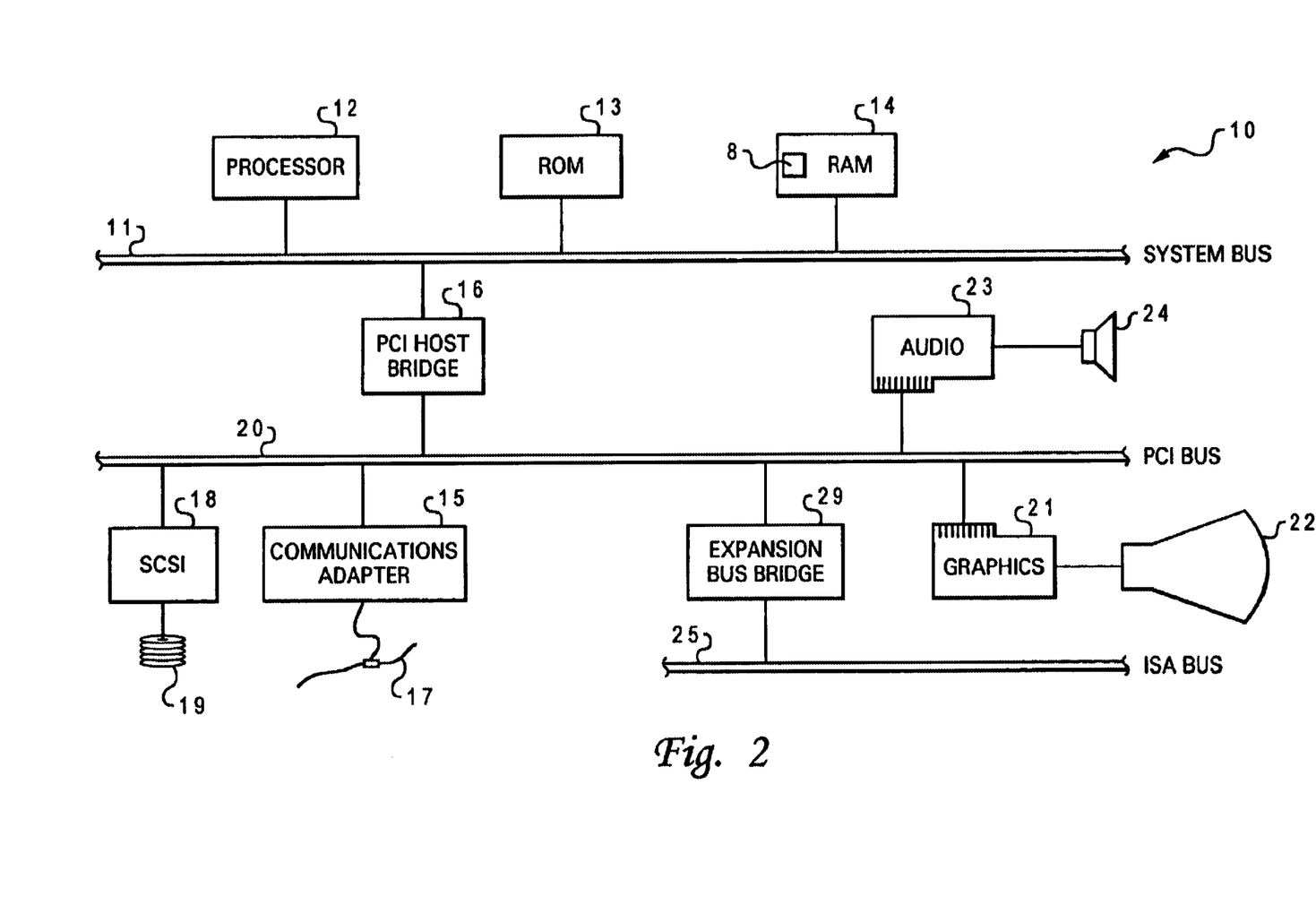
FIG. 2 illustrates an exemplary embodiment of a client computer in the computer network shown in FIG. 1.

Referring now to FIG. 2, there is illustrated an exemplary embodiment of a network connected computer system, which may be a server or client, such as first client 101. As shown, computer system 10 has a processor (CPU) 12, a read-only memory (ROM) 13, and a Random-Access Memory (RAM) zits 14 connected to a system bus 11 of computer system 10. CPU 12, ROM 13, and RAM 14 are also coupled to peripheral component interconnect (PCI) local bus 20 of computer system 10 through PCI host bridge 16. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

Also attached to PCI local bus 20 are communications adapter 15, small computer system interface (SCSI) 18, and expansion bus bridge 29. Communications adapter 15 is utilized for connecting computer system 10 to a network 103 via a network connector 17. SCSI 18 is utilized to control high-speed SCSI disk drive 19. Expansion bus bridge 29, such as a PCI-to-ISA bus bridge, may be utilized to couple ISA bus 25 to PCI local bus 20. As shown, an audio adapter 23 is attached to PCI local bus 20 for controlling audio output through speaker 24. Graphics adapter 21 is also attached to PCI local bus 20 for controlling video output through display 22. Alternate embodiments of the computer system may include additional peripheral components.

Computer system 10 also preferably includes an interface such as a graphical user interface (GUI) and an operating system (OS) that reside within machine readable media to direct the operation of computer system 10. In the preferred embodiment, the OS (and GUI) contains additional functional network components that permits the OS to interact with library extension utility and network control utility of the invention. Any suitable machine-readable media may retain the GUI and OS, such as RAM 14, ROM 13, SCSI disk drive 19, and other disk and/or tape drive (e.g. magnetic diskette, magnetic tape, CD-ROM, optical disk, or other suitable storage media). Any suitable GUI and OS may direct CPU 12. Such as the AIX operating system developed by International Business Machines Corporation of Amonk, N.Y., may be utilized.

Further, computer system 10 preferably includes at least one software application (e.g., program product including library extension utility and network control utility) 8 that resides within machine readable media within RAM 14. A software application contains instructions that when executed on CPU 12 interact with OS to execute the operations depicted in the figures as described herein.

Although the invention is illustrated as being implemented in the network and computer system illustrated in FIGS. 1 and 2, the invention may, however, be implemented in other types of data processing systems and network. Thus, while the present invention may be described with reference to these figures, the references should not be construed in a limiting sense.

The present invention is directed to a method, system, and program product executed on a network connected computer by which new network library functional elements (i.e., library extensions and/or enhancements) are added to the standard network library using hooks within the network call response to call-back to a library extension utility. The invention provides the added functional elements and a control mechanism (utility) to permit the added elements to co-exist and interact with standard library functions when completing a network activity.

In the preferred embodiment, a network control utility and a network library extension utility are made available within a software package, which may be loaded on the network connected computer system. Upon installation, the network control utility upgrades the OS and other network software (or applications) to permit additional network activity based on the functions within the network library extension utility to be managed by the network control utility. Thus, for example, when a network connection request, data send operation, or data receive operation occurs, the network control utility determines whether or not the network activity references a function which is not available in the standard library, but is available in the library extension utility. Based on this determination, the network control utility may issue a call back to the library extension utility to complete the function.

The control utility issues a call-back (i.e., a jump to another point not in sequence) from the standard call response to the library extension utility to complete the particular network activity. In a preferred embodiment, hooks are placed in the network library processing code (i.e., the code which controls network activity responses) to allow external software routines, located in the library extension utility, to register themselves to be called back for each of the additional functions provided by the library extension utility. As utilized herein, the term "hook" is defined as (1) a location in a routine or program at which other routines can connect or (2) inserted routine calls for referencing external functional elements. A hook is the method by which a call-back mechanism is registered. In one embodiment, the code of the standard library stack is augmented with hooks during installation of the extension utility. The hooks are registered during installation utilizing filters, which enable the calls out to external libraries. The modification of the send, receive, connect, and network-specific library process codes thus allows the call-back functionality of the present invention.

Thus, during implementation, the invention incorporates additional steps in the network connection process. This embodiment also allows for the utilization of a standard networking interface, such that, for example, the underlying TCP may be utilized to support the invention without rewriting the TCP.

This invention adds the capability to encapsulate data and functionality by utilizing call-backs. Encapsulation places data into an "envelope," surrounded by protocol control information, such as source and destination address, error-checking data, etc. The encapsulated information and other surrounding information then represents the packet, frame or data unit. When a message is to be sent to another computer, the connection protocol and transport protocol libraries in the network connect the network link and create the packet, respectively, to establish a communication link between the two computers. The present invention extends that functionality of protocol stacks by adding a call back into one of the protocol encapsulation layers. Encapsulation of the new library function within the protocol preferably occurs at the first layer encapsulation.

Figure 3A:
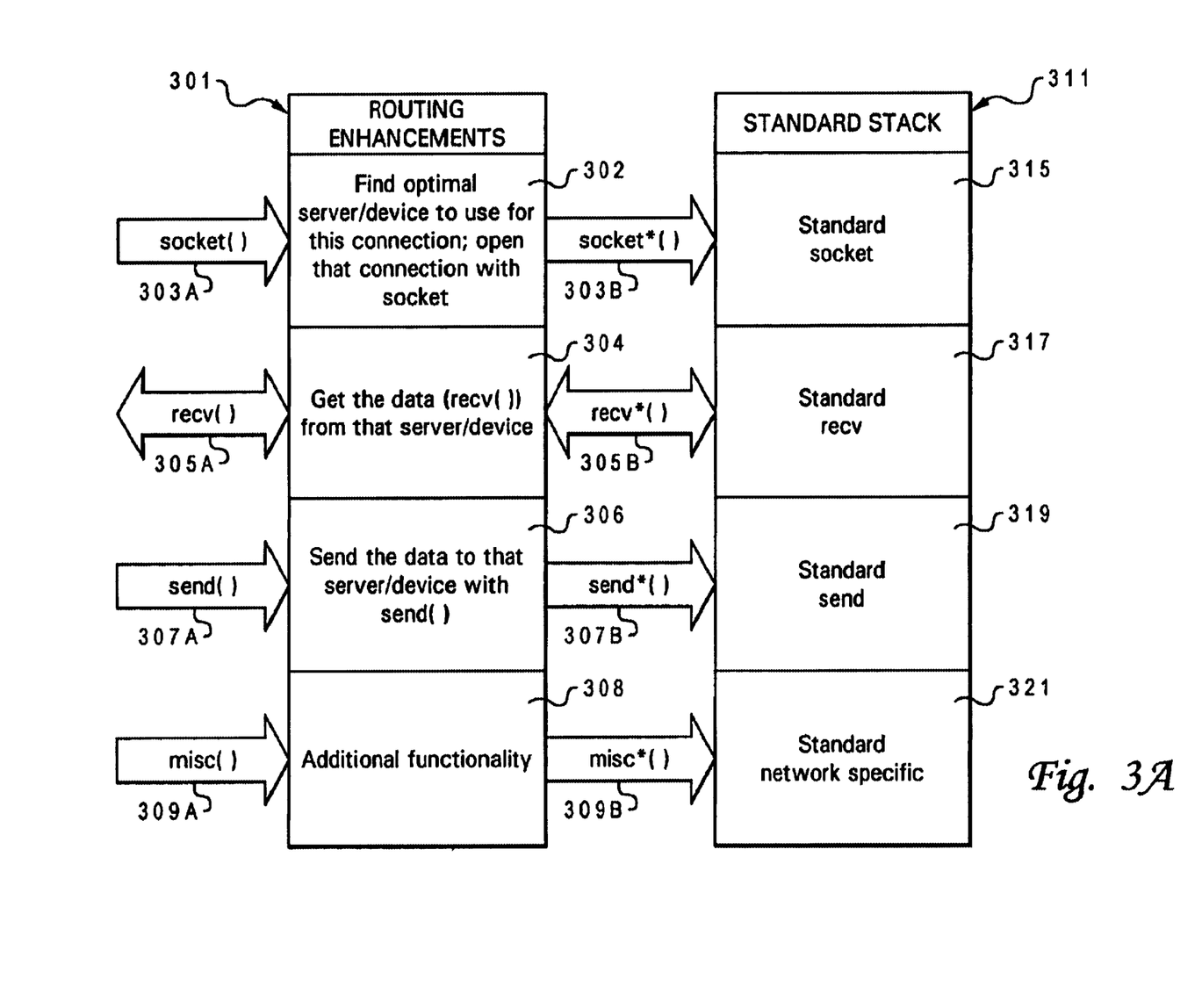
FIGS. 3A and 3B depict block diagrams of a library enhancement utility interfacing with the standard network library in accordance with the present invention.

FIG. 3A is a conceptual view of the interaction between an enhanced library stack and standard library stack within a network connected computer system (hereinafter computer). Standard library stack 311 is illustrated with socket interface 315, data receipt interface 317, data send interface 319, and network specific interface 321. A routing enhancement stack 301 having corresponding interfaces is also shown. In the illustrated embodiment, modification of a network process by routing enhancement stack 301 occurs before the network process encounters the standard library stack 311. Modification of the network process by the routing enhancement stack preferably occurs after the network process during data receipt.

Each interface in standard library stack 311 executes a particular network function associated with the network library on the computer. Network operations are received at the interfaces from the internal client process and/or the external network process(i.e., there is a 2 way transfer of information). Network operations generated by internal client processes, represented as arrows in the figure, initially include socket processes 303A, data receipt processes 305A, data send processes 307A, and network-specific processes 309A. In the illustrated embodiment, the client-network processes are routed through routing enhancements stack 301 either before or after the standard library stack.

The components of routing enhancement stack 301 complete a particular function or series of functions, which may result in a modification of the initial network processes in a way which enhances the standard library functions. For example, socket routing enhancement 302 may locate the optimal server or device for the requested network connection and open that connection with the socket. Socket routing enhancement 302 passes modified socket input 303B to socket interface 315 of standard library stack 311 to complete standard protocol encapsulation, etc. Although, standard library stack 311 processes modified socket input 303B modified socket input 303B retains the additional enhanced characteristic.

Data receive routing enhancement 304 operates on data received from the server or other device of the network. Data is first received at standard received data stack 317 and is de-encapsulated. Data is then forwarded to the data receive routing enhancements 304, where the data is modified accordingly.

Data send routing enhancement 306 modifies the initial data 307A to include additional functionality. Data send routing enhancement 306 then forwards modified send data 307B to standard data send stack 319 for processing. Finally, network specific functionality 309A, produced by the network system or specifically by the developer or user, is modified by a corresponding routing enhancement 308 to produce modified network specific functionality 309B, which is issued to standard network stack 321. As described in the above illustrative embodiment, routing enhancements operates as a buffer, which accepts the conventional network processes and modifies them to include specific functionality not available with the standard library stack.

Figure 3B:
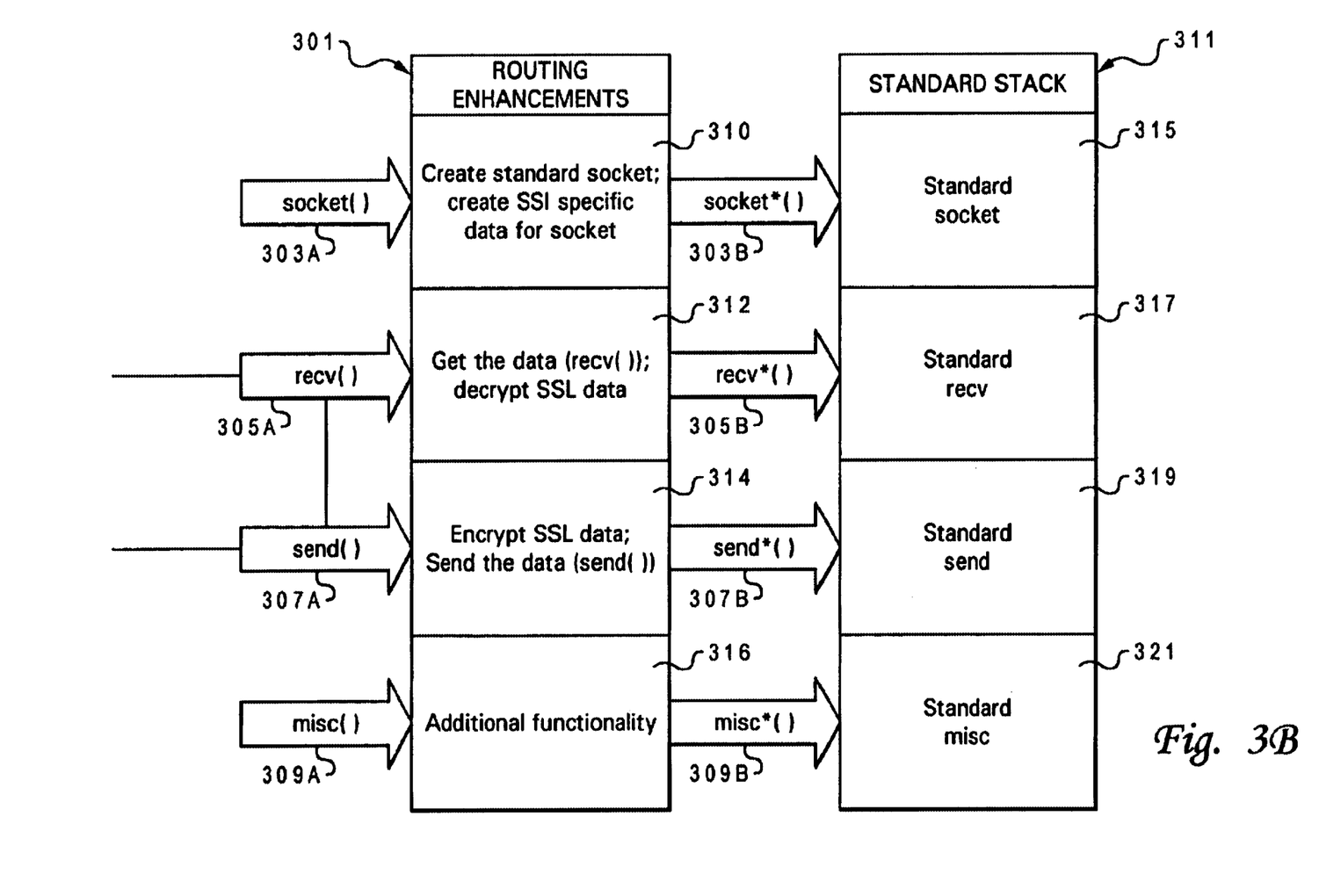

FIG. 3B illustrates a more specific example of the implementation of the library enhancement configuration shown in FIG. 3A. Like elements in FIGS. 3A and 3B are numbered the same. In FIG. 3B a secure socket layer (SSL) network environment is implemented as a library enhancement function. SSL provides an encryption service for data traveling on the network. This embodiment may thus be utilized to improve privacy of the network, which is implemented with a standard stack exhibiting little security for transmitted data. Standard library stack 311 interface with the socket in a TCP/IP environment. The library enhancement stack 301 containing SSL code is loaded into the computer and interacts with standard stack 321, as described above. Library enhancement utility 301 is designed with the same calls and name functions as the standard stack, and operates on data before calling the standard stack when data is transmitted from client to the network. Similar input data are presented as in FIG. 3A. The socket SSL enhancement 310 creates the standard socket and also creates SSL specific data for the socket. SSL specific data are presented to standard stack 311 as modified input 303B. Whenever a network call, such as a file transfer protocol (FTP) call, is identified, the call creates a socket, which is sent through SSL encryption. During receipt of network data encoded with SSL, standard received data stack 317 forwards the encoded data to data receive SSL enhancement 312, which decodes the SSL encoded data. With the transmission of data to the network, data send SSL enhancement 314 encrypts the data utilizing SSL prior to sending it to the data send standard stack 321. Also, network-specific SSL enhancement 316 may provide SSL encryption for the particular network function. Thus, network I/Os can be encrypted with an SSL enhancement to improve data security.

Figure 4:
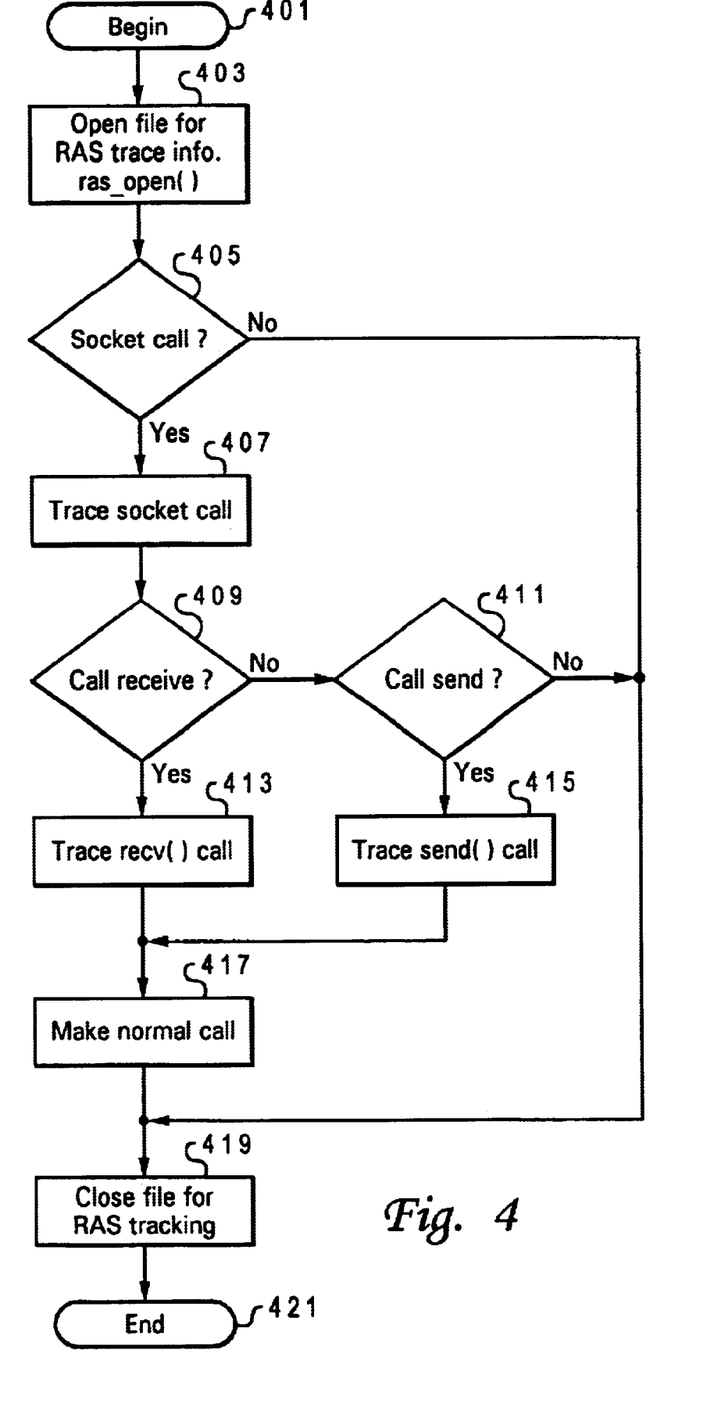
FIG. 4 is a high level logical flowchart illustrating an exemplary embodiment of a method for completing a RAS tracking utilizing the functionality of the invention.

FIG. 4 illustrates a process of enhancing the functionality of a standard stack of a library using a library enhancement utility, which has a Reliability, Availability and Serviceability (RAS) tracking environment. According to the process new application programming interface (APIs) may be required and made accessible by RAS_open (filename) command. The new APIs are added primarily to trace reliability characteristics during a particular network process. The process begins at block 401 and thereafter proceeds to block 403 in which a file is opened for RAS trace information. A determination is made whether a socket call has been received at block 405. If a socket call has not been received, the file is closed for RAS tracking at block 419. If, however, a socket call is received, the reliability of the socket call is traced at block 407. A next determination is made whether the network process is a receipt of data at block 409. If the network indicates the receipt of data, the reliability of the data receipt process is traced at block 413 before the data receive process is completed at block 417. If however, the network process is not of received data, a determination is made whether the network process is for transmission of data at block 411. If the network process does not indicate transmission of data, then an error has occurred, and the file is closed for RAS tracking at block 419. Otherwise, the network process for data transmission is traced at block 415. After the normal data transmission process is completed at block 417, the file is closed for RAS tracking at block 419 and the process ends at block 421.

Figure 7:
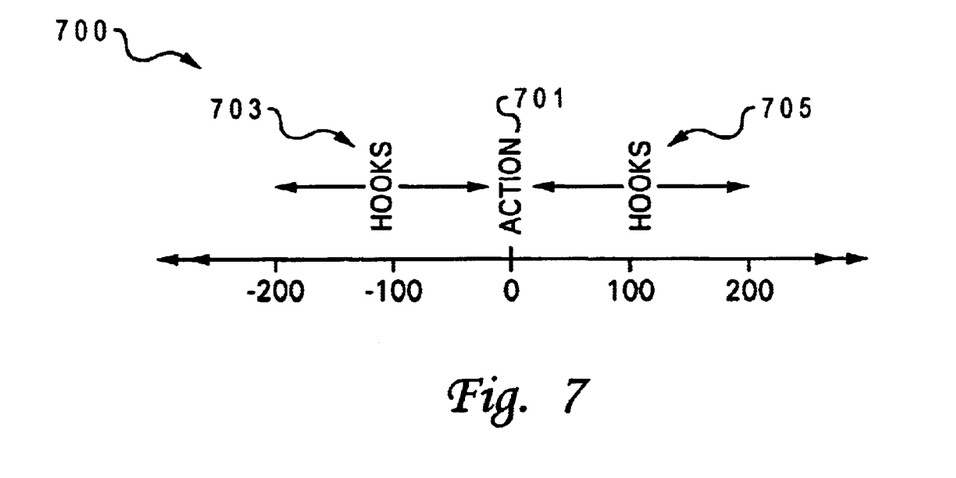
FIG. 7 is a time line depicting the timing of hooks during a network call in accordance with one embodiment of the invention.

In the preferred embodiment of the invention, the particular library extension functional elements are executed according to a priority. The specific calls or processes may be placed in a priority queue in the order of priority and performed according to that order. FIG. 7 depicts a time line for performing a network action when priority information is being included with the call-backs/hooks for the library extension services. A central priority point 701 represents the point at which the standard network library processes normally occur. Points left of central priority point 701 represent pre-network library action call-back (or hooks) 703, while points to the right represent post-network library process call backs 705. The illustrated time values represent relative times, arbitrarily selected, and not necessarily measured processor ticks.

Thus, when different hooks are presented associated with a call, the hooks are organized according to their priority. The standard library process is the reference point and is given a priority value of 0. All associated hooks are given priorities based on that reference point. Thus, a hook with a priority of 100 will be called before a hook of priority 200 but after a hook with priority −100 and after the standard library process priority =0.

In one embodiment, adding and removing a hook from the network process code may be implemented with the following commands, respectively:

reghook(action, callback, priority) and unreghook(action, callback, priority).

Here, the reghook call registers a hook, and the unreghook call unregisters a hook. Both of these calls have three parameters: action, callback, and priority. The action perameter specifies the corresponding network call in the standard library stack. The priority parameter is a relative time before or after the performance of the standard library processes when the hook is called. The callback parameter refers to the specific library extension function (or hook) being called. The unreghook calls permits the removal of a registered hook from later network calls when it is no longer required or preferred. Thus, once a hook is registered, it may later be unregistered. The process of un-registering a hook may be automatically activated in response to the occurrence of specific pre-defined or user-defined events. For example, with a SSL library extension, a hook may be unregistered for a specific type of network call, or at the end of a work day (5:00 pm) when secured encoded communication is no longer required.

Two specific examples are now presented utilizing code for an SSL extension source and a RAS extension source respectively. The coded segments are:

(1) SSL

Startup
reghook(recv,ssl-recv, 100);
reghook(send, ssl_send, −100);
reghook(socket, ssl_socket, 100);
. . .

Shutdown
unreghook(recv, ssl_recv, 100);
. . . ; and (2) RAS

Startup
reghook(recv, ras-recv, 200);
reghook(send, ras_send, 200);
reghook(socket, ras_socket, 200);
. . .

Shutdown
unreghook(recv, ras_recv, 200);
. . .

Figure 6A:
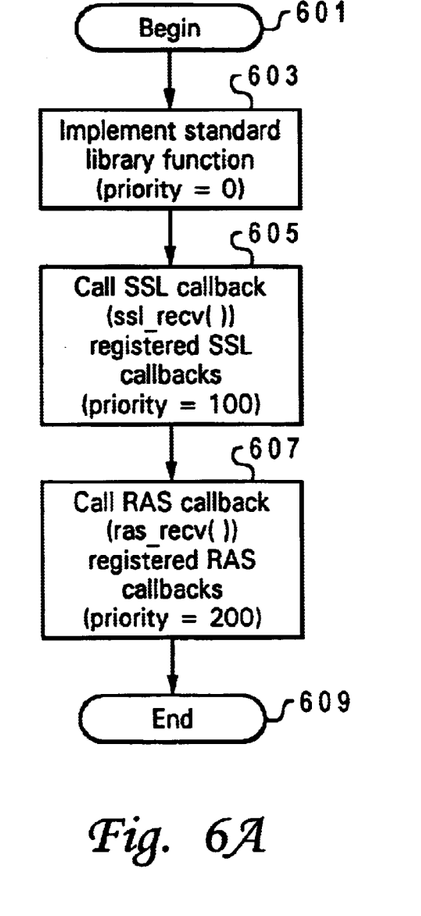
FIGS. 6A and 6B are flow charts depicting run-time processing of network calls for data send and data receipt in accordance with the present invention.

FIG. 6A illustrates the runtime behavior of a network packet receipt process with the above coded hooks embedded within source code of a network library data receive process. Each event occurs as illustrated in the order of priority. Thus, after the network data receipt process begins at block 601, the standard library process with priority=0 is implemented at block 603. Following the standard library process, an SSL call-back with priority 100 is implemented and registered at block 605. This causes the encoded received data to be decoded. Then the RAS hook with priority 200 is called at block 607, before the network packet receipt process ends at block 609.

Figure 6B:
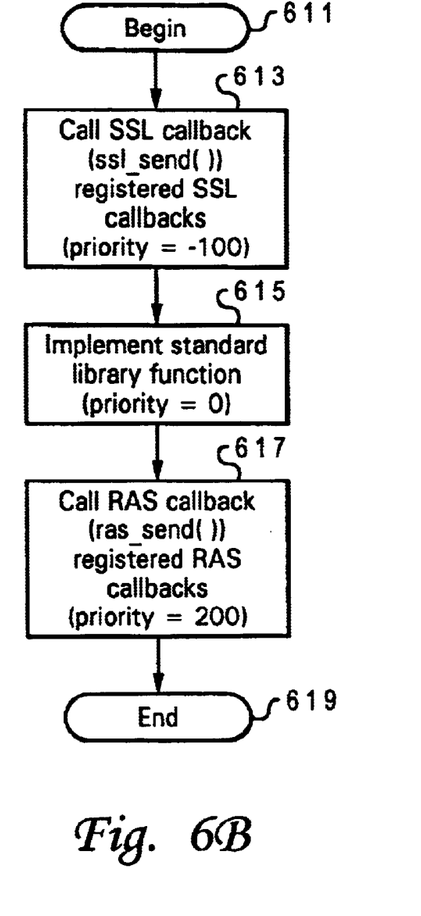

FIG. 6B illustrates runtime behavior for transmitting data out to the network based on the above code. The process begins at block 611, and thereafter proceeds to block 613 where an SSL callback with priority −100 is implemented and registered. Following the SSL callback, the standard library processes with priority 0 are implemented at block 615. Then the RAS callback with priority 200 is implemented and registered at block 617, before the process ends at block 619.

The illustrative embodiments in FIGS. 6A and 6B depict only a single layer of priority. The invention, however, also contemplates multiple layers of priority. In order to prevent two library extensions from conflicting when registered at the same priority (e.g., both at 100), a multiple layer priority level scheme may be implemented. In the multiple layer priority, layer one may be given the highest priority, with subsequent layers receiving reduced levels of priority.

Figure 5:
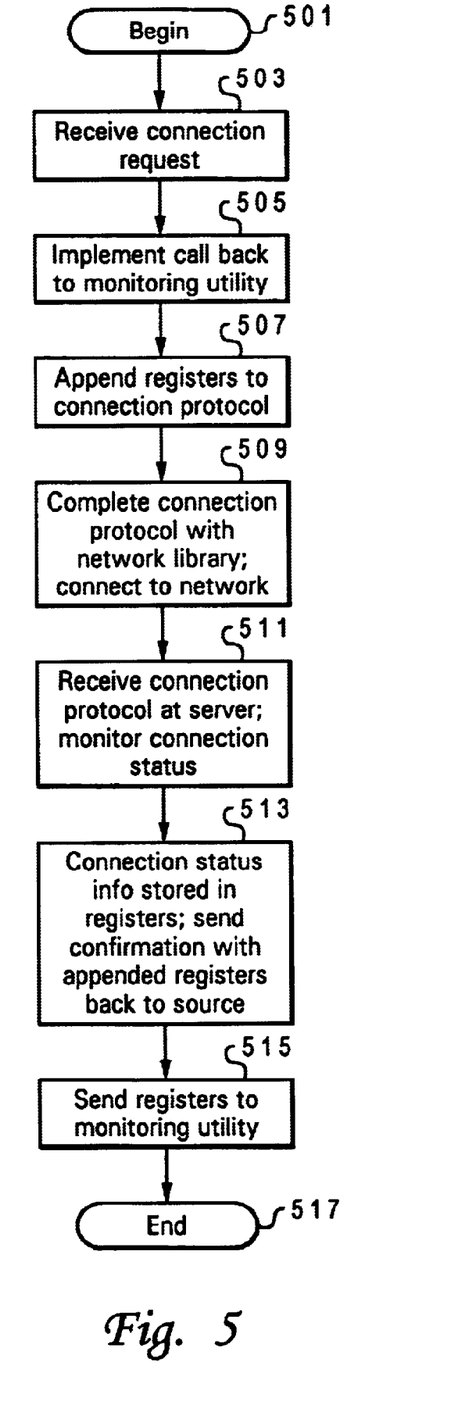
FIG. 5 is a high level logical flowchart illustrating an exemplary embodiment of a method of utilizing call-backs within a connection protocol to monitor network status in accordance with one embodiment of the invention.

One important application of the present invention occurs with network monitoring. New network hardware and software are being developed, which allow selection of better connection routes, etc., for network connection. It is desirable to be able to complete this process without having to develop complete network libraries with a network connection monitoring functionality. FIG. 5 is a flow chart illustrating the processes involved in utilizing the call-back functionality to monitor a network connection in accordance with another embodiment of the present invention. The process begins at block 501 and thereafter proceeds to block 503, where a connection request is received. A connection utility (or the network control utility), which generates the connection protocol, issues a call-back to a monitoring utility at block 505. During network connection, a connection-oriented protocol is responsible for first establishing a logical connection with the destination, and a confirmation of connection message is sent to the source once the logical connection is completed. The monitoring utility provides a set of registers, which are embedded (or encapsulated) within the connection protocol at block 507. Encapsulation of the connection protocol is completed at the standard network library, and the connection protocol is issued to the network at block 509. When the connection protocol arrives at the destination (typically a network server), the registers are updated with specific information about the network connection status, such as congestion of the connection route, at block 511. The connection protocol then returns a confirmation message along with the appended registers to the source computer at block 513. At the source computer, the connection utility recognizes the registers and calls the monitoring utility to forward the information registers at block 515. Then the process ends at block 517. Further description of the use of this functionality of the invention is made in U.S. patent application, Ser. No. 09/584,808, still pending titled "Method for Dynamically Affecting Browser Network Communications Performance," which is filed concurrently herewith.

Figure 8A:
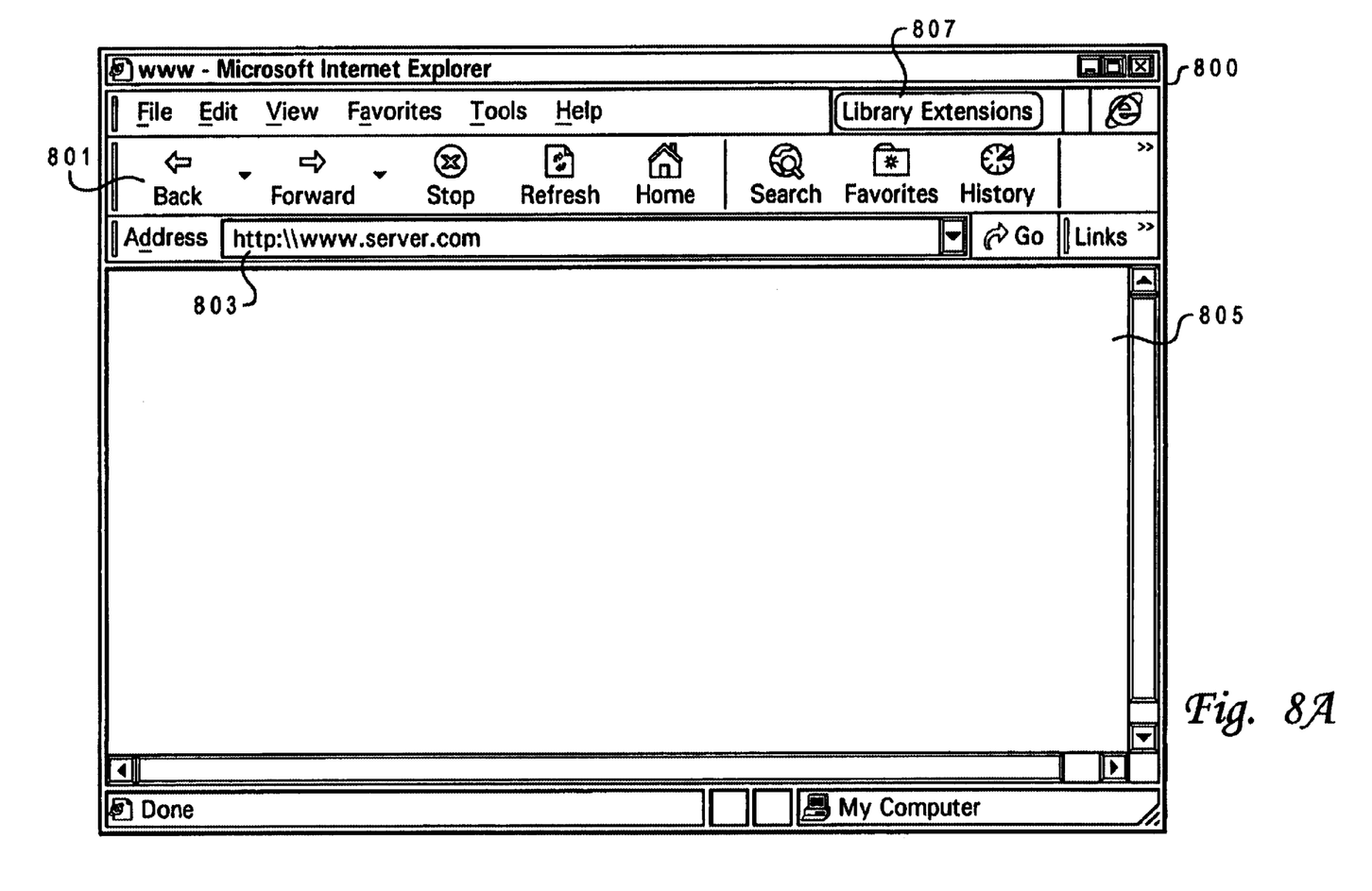
FIG. 8A illustrates a modified client browser utilized in one embodiment of the present invention.

FIG. 8A illustrates a GUI of a client browser application utilized in a preferred embodiment of the invention. Client browser 800 is the browser application running on a client, which controls connection to the network. In the illustrated embodiment, client browser 800 has selection buttons 801, a search field 803, display frame 805, etc. Client browser 800 also has a "library extensions" button 807, which when selected by a user opens the library extensions GUI illustrated in FIG. 8B.

Figure 8B:
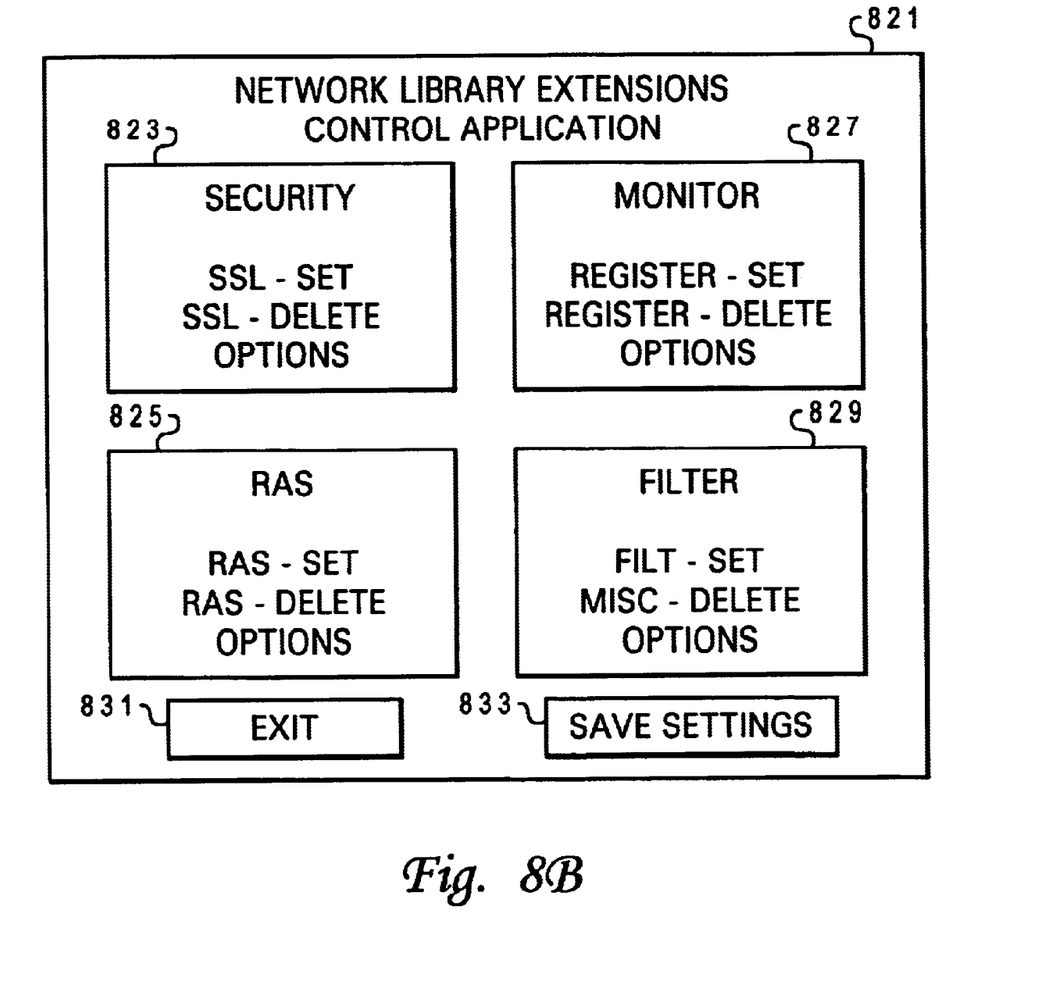
FIG. 8B is a network extension GUI that provides user selection of library extension services in accordance with one embodiment of the present invention.

Library extensions GUI 821 of FIG. 8B includes a number of library extension function boxes by which a user may selectively apply a particular call back function (or hook) to his network interactions. Illustrated are security function box 823, RAS function box 825, network monitor function box 827 and filter function box 829. Within each function box, a user has the option to set the call back function, or alternatively, to remove the call back function from the network processes. The user may also select additional options, such as relative orderly functions and issuing a user prompt prior to applying the particular call back function. It should be understood that the GUIs of FIGS. 8A and 8B are presented merely for illustrative purposes and that other types of user interfaces are possible, including pull-down menus or scripted text. Use of a user selectable library extension GUI is, however, optional as the invention may be implemented without user input (i.e., automatic implementation upon loading of software utilities).

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for extending network library services within a computer system comprising the steps of:

extending software implemented network library functions with a network utility comprised of a plurality of user-selectable network library extensions that each provide a functional operation on data being sent and received from said computer system to an external network, wherein functions related to select ones of said plurality of additional library extensions are added to existing network library services based on selection by a user and wherein said selected library extensions are each associated with said network library services via a link that associates the library extension with a specific code sequence of said network library services; and when a network process is being completed via said network library services, dynamically implementing the user-selected ones of said network library extensions within a pre-set order of said code sequence for implementing standard network library services.

2. The method of claim 1, wherein said extending step includes:

installing a network library extension utility into a processing environment of said computer system, wherein the installation places a series of software hooks at specific locations within said code sequence to initiate the selected ones of the library extensions; and wherein subsequent execution of said network library functions results in a system call to implement a related one of said extended services when a hook associated with one of the selected library extensions is found within the code sequence.

3. The method of claim 2, further comprising the steps of:

opening a graphical user interface for user selection of specific ones of said network library extension functions desired to be included in an execution path for network processes provided by said network library services;

reading said user selections; and automatically applying hooks linking each of said selected library extensions to said code sequence of said network library services wherein only the user-selected library extensions are initiated during execution of said network library services.

4. The method of claim 2, wherein said installing step includes the step of automatically modifying said code sequence based on criteria related to functional elements within said network library extension utility.

5. The method of claim 4, wherein said automatically applying step includes the step of placing said hooks within said code sequence based on a determination of a relative priority of each of said one or more functions to said network library services.

6. The method of claim 1, wherein said one or more functions includes a network connection monitoring function and said implementing step further includes the steps of:

appending a set of network status evaluation registers to a connection protocol packet;

issuing said connection protocol packet out to said network, wherein a remote network device receiving said connection protocol packet is configured with a connection protocol designed to enable said device to recognize both said connection protocol packet and said network status evaluation registers and modify a content of said network status evaluation registers before returning a confirmation packet with said network status evaluation registers appended thereto;

monitoring for a return of a connection confirmation packet with said registers appended; and upon return of said connection confirmation package, forwarding said registers to a network monitoring utility for processing of data stored in said registers, wherein said network monitoring utility is associated with said network library extensions utility.

7. The method of claim 1, wherein said one or more extended library functions includes a secure socket layer function, and said calling step further includes the steps of:
encoding data being transmitted out to said network; and
decoding data being received at said computer system from said network.

8. The method of claim 1, wherein said one or more extended library functions includes a reliability, availability and serviceability (RAS) tracking function, and said dynamically implementing step further includes the steps of activating RAS tracking for sent and received transmissions on said network during a pre-determined network process completed by one of said network library services, wherein said RAS tracking is only activated for said pre-determined network process.

9. The method of claim 1, further comprising the step of enabling removal of an association previously made within said code sequence, wherein said removal is a user removal or a dynamic removal based on pre-defined criteria and occurrence of pre-set conditions, such as, time of the day, type of transmission being completed, and level of security required.

10. A method for extending network library services on a computer system comprising the steps of:
opening a network extension library graphical user interface (GUI), which displays a list of a plurality of available network library extensions that may be selected by a user to apply to a network library function for controlling network activity;
selecting at least one of the plurality of available network extension functions; and
dynamically associating said at least one network extension function with said network library services, wherein subsequent network access operations are subject to the functionality associated with said at least one network library extension along with standard network library functions.

11. The method of claim 10, wherein said selecting step further includes the step of setting associated elements, including relative priority, for said particular network extension function.

12. The method of claim 10, wherein said associating step is completed by choosing an option to apply said user selections to said network library services and said user selections are linked to specific sections of network library services code and are implemented during network processing according to their relative positions within said code.

13. A system for extending network library services within a computer system comprising:
a library extension utility having additional network library services as functional elements;
a network control utility for managing a placement and removal of hooks associated with said functional elements within a code sequence of said network library services, wherein selected ones of said functional elements are activated by a user and said network control utility enables initiating of a call to execute a selected functional element when a hook associated with a user-selected functional element is encountered; and
network function processing mechanism for executing said code sequence with said hooks so that the functional elements of said library extension utility are implemented whenever a hook is encountered in said code sequence to effectively extend the available network library services.

14. The system of claim 13, wherein said control utility includes means for placing said hooks within said code sequence based on a relative priority of said functional elements to said network library services.

15. A computer program product for enhancing network library services within a computer system, said program product comprising:
a computer readable medium; and
program instructions stored on said computer readable medium for:
extending software implemented network library functions with a network utility comprised of a plurality of user-selectable network library extensions that each provide a functional operation on data being sent and received from said computer system to an external network, wherein functions related to select ones of said plurality of additional library extensions are added to existing network library services based on selection by a user, and wherein said selected library extensions are each associated with said network library services via a link that associates the library extension with a specific code sequence of said network library services;and
when a network process is being completed via said network library services, dynamically implementing the user-selected ones of said network library extensions within a pre-set order of said code sequence for implementing standard network library services.

16. The computer program product of claim 15, wherein said program instructions for said establishing step includes program instructions for initiating an installation of a network library extension utility into a processing environment of said computer system, wherein the installation places a series of software hooks at specific locations within said code sequence to initiate the selected ones of the library extensions; and
wherein subsequent execution of said network library functions results in a system call to implement a related one of said extended services when a hook associated with one of the selected library extensions is found within the code sequence.

17. The computer program product of claim 16, further comprising program instructions for:
displaying a graphical user interface for user selection of specific ones of said network library extension functions desired to be included in an execution path for network processes provided by said network library services;
receiving said user selections; and
automatically applying hooks linking each of said selected library extensions to said code sequence of said network library services, wherein only the user-selected library extensions are initiated during execution of said network library services.

18. The computer program product of claim 16, wherein said program instructions for said initiating step includes program instructions for automatically modifying said code sequence based on criteria related to functional elements within said network library extension utility.

19. The computer program product of claim 18, wherein said program instructions for said automatically applying step includes program instructions for placing said hooks within said code sequence based on a determination of a relative priority of each of said one or more functions to said network library services.

20. The computer program product of claim 15, wherein said one or more functions includes a network connection monitoring function and further including program instructions for:

appending a set of network status evaluation registers to a connection protocol packet;

issuing said connection protocol packet out to said network, wherein a remote network device receiving said connection protocol packet is configured with a connection protocol designed to enable said device to recognize both said connection protocol packet and said network status evaluation registers and modify a content of said network status evaluation registers before returning a confirmation packet with said network status evaluation registers appended thereto;

monitoring for a return of a connection confirmation packet with said registers appended; and upon return of said connection confirmation package, forwarding said registers to a network monitoring utility for processing of data stored in said registers, wherein said network monitoring utility is associated with said network library extensions utility.

21. The computer program product of claim 15, wherein said one or more extended library functions includes a secured socket layer function, and further including program instructions for:

encoding data being transmitted out to said network; and decoding data being received at said computer system from said network.

22. The computer program product of claim 15, wherein said one or more extended library functions includes a reliability, availability, and serviceability (RAS) tracking function, and further including program instructions for initiating RAS tracking for sent and received transmissions on said network during a pre-determined network process completed by one of said network library services, wherein said RAS tracking is only activated for said pre-determined network process.

23. The computer program product of claim 15, further comprising program instructions for enabling removal of an association previously made within said code sequence, wherein said removal is a user removal or a dynamic removal based on pre-defined criteria and occurrence of pre-set conditions, such as, time of the day, type of transmission being completed, and level of security required.

* * * * *